Dec. 6, 1938.  C. H. McKINSTRY  2,138,930
FLUID PRESSURE BRAKE
Original Filed July 16, 1937
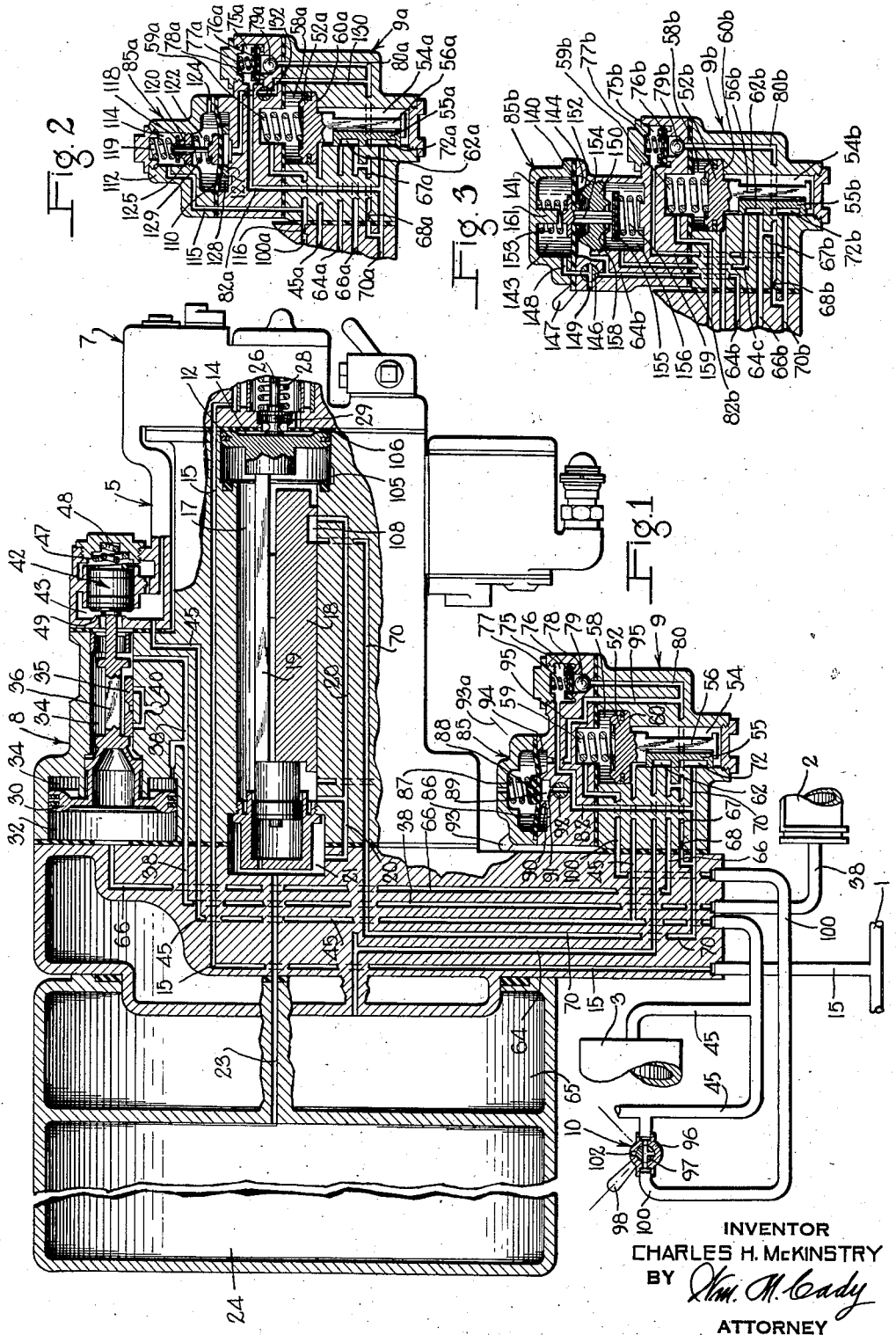
INVENTOR
CHARLES H. McKINSTRY
BY *Wm. M. Cady*
ATTORNEY Patented Dec. 6, 1938

2,138,930

UNITED STATES PATENT OFFICE 2,138,930

FLUID PRESSURE BRAKE

Charles H. McKinstry, Wilmerding, Pa., assignor to The Westinghouse Air Brake Company, Wilmerding, Pa., a corporation of Pennsylvania Application July 16, 1937, Serial No. 153,881
Renewed October 10, 1938

19 Claims. (Cl. 303—40)

This invention relates to a fluid pressure brake equipment, and more particularly to a locomotive brake equipment of the type shown in U. S. Patent No. 2,009,841, issued July 30, 1935, to Ellis E. Hewitt, and in my U. S. Patent No. 2,045,159, issued June 23, 1936.

The brake equipment shown in the above identified patents has a distributing valve having an application portion operative on an increase in fluid pressure to supply fluid under pressure to the brake cylinders to effect an application of the brakes on the locomotive. This distributing valve also has an equalizing portion subject to the opposing pressures of the fluid in the brake pipe and of the fluid in a pressure chamber, and operative on a reduction in brake pipe pressure to supply fluid under pressure from the pressure chamber to the application portion.

In the brake equipment shown in certain of the above identified patents a delay valve is provided which is operative in one position to restrict the rate of supply of fluid by the equalizing portion to the application portion during an emergency application of the brakes, to thereby restrict the rate of build up of brake cylinder pressure on the locomotive. This feature is valuable where the locomotive is employed to haul long trains, and prevents a rapid build up of brake cylinder pressure on the locomotive which would result in a rapid reduction in the speed of the locomotive, and a harsh run in of the slack in the train.

The restriction in the rate of increase in brake cylinder pressure on the locomotive retards the application of the brakes on the locomotive, and thereby increases the time and distance required to stop the locomotive and the train hauled by the locomotive. This may be objectionable where the locomotive is employed in high speed service, such as fast passenger service.

It is an object of this invention to provide an improved locomotive brake equipment of the type described which includes a delay valve operative during an emergency application of the brakes to restrict the rate of supply of fluid under pressure to the application portion of the distributing valve, and incorporating means operative a predetermined time interval after an emergency application of the brakes to effect an increase in the rate of supply of fluid to the application portion to thereby increase the rate of application of the brakes on the locomotive, and correspondingly reduce the time and distance required to stop the locomotive and a train hauled thereby.

A further object of the invention is to provide an improved locomotive brake equipment of the type described, and in which the means for increasing the rate of supply of fluid to the application portion following the supply of fluid thereto at a restricted rate may be employed or not as service conditions require.

Another object of the invention is to provide an improved locomotive brake equipment of the type described.

Other objects of the invention and features of novelty will be apparent from the following description taken in connection with the accompanying drawing, in which Fig. 1 is a fragmentary diagrammatic view, largely in section, of the distributing valve of a locomotive brake equipment embodying this invention, and Figs. 2 and 3 are sectional views showing modified forms of delay valves provided by this invention, and which may be employed in the equipment shown in Fig. 1.

Referring to the drawing, and particularly to Fig. 1 thereof, the locomotive brake equipment shown comprises a brake pipe 1, a brake cylinder 2, a reservoir 3, and a distributing valve indicated generally by the reference numeral 5.

The distributing valve 5 has an equalizing portion 7, an application portion 8, and a delay valve device 9, while the delay valve device 9 has associated therewith a control valve 10.

The locomotive brake equipment provided by this invention is an improvement on the locomotive brake equipment shown in the above identified patents, and only such portions of the construction and operation of the equipment are illustrated and described in this application as are essential to the understanding of this improvement.

The equalizing portion 7 of the distributing valve 5 comprises a body having a bore therein in which is mounted a piston 12 having at one face thereof a chamber 14, which is constantly connected by way of a branch passage and pipe 15 with the brake pipe 1. The piston 12 has at the other face thereof a valve chamber 17 in which is mounted a main slide valve 18 operated by the piston 12 through the medium of a stem 19. The valve chamber 17 is constantly connected by way of a passage 20 with a chamber 21 which is constantly connected by way of a passage 23 with a pressure chamber 24.

The chamber 14 has mounted therein a plunger 26 which is yieldingly pressed to the left, as viewed in Fig. 1 of the drawing, by a coil spring 28, while the end of the plunger 26 is adapted to be engaged at certain times by a projection 29 carried by the piston 12, as will hereinafter more fully appear.

The application portion 8 comprises a piston 30 mounted in a bore in the body of the distributing valve 5 and having at one face thereof an operating chamber 32, and having at the other face thereof a valve chamber 34 in which is mounted a brake cylinder exhaust slide valve 35, which is operated by means of a stem 36 formed integral with a piston 30. The valve chamber 34 is constantly connected with the brake cylinder 2 by way of a passage and pipe 38, while the slide valve 35 controls communication between the valve chamber 34 and an atmospheric exhaust passage 40.

The application portion 8 includes, in addition, a supply valve device indicated generally by the reference numeral 42, and mounted in a chamber 43 which is constantly connected by way of a passage and pipe 45 with the reservoir 3. The supply valve device 42 is yieldingly pressed by means of springs 47 and 48 into engagement with an annular seat rib 49 surrounding a passage open to the valve chamber 34. The end of the stem 36 is adapted to engage the supply valve device 42 to move this valve device away from the seat rib 49 against the springs 47 and 48 to thereby permit the supply of fluid under pressure from the reservoir 3 to the valve chamber 34, and thence by way of the passage and pipe 38 to the brake cylinder 2.

The delay valve device 9 comprises a piston 52 which is mounted in a bore in a section of the body of the distributing valve 5, and has at one face thereof a valve chamber 54 which is constantly connected with the main reservoir 3 by way of a branch of the passage 45. A slide valve 55 is mounted in the valve chamber 54 and is operated by means of a stem 56 formed integral with the piston 52.

The piston 52 has at the other face thereof a chamber 58 which is adapted to be charged with fluid under pressure at certain times, as will hereinafter more fully appear, while a spring 59 is mounted in this chamber and yieldingly presses the piston 52 into engagement with a shoulder 60 at an end of the bore in which the piston is mounted. This is the delay position of the piston 52 and slide valve 55, and in this position of the slide valve 55, a cavity 62 therein establishes communication between the passage 64, leading to an application chamber 65, and a passage 66, which is connected to the operating chamber 32 at the face of the piston 30 of the application portion 8 of the distributing valve.

The body of the delay valve device 9 has a passage 67 therein which is constantly connected to the passage 66, and is connected through a choke 68 with a passage 70.

The slide valve 55 of the delay valve device 9 has a port 72 therein which, in this position of the slide valve 55, blanks the end of the passage 70, which leads from a port in the seat of the slide valve 18 of the equalizing portion 7.

The body of the delay valve device 9 has formed therein a valve chamber 75 in which is mounted a check valve 76, which is yieldingly pressed by means of a coil spring 77 into engagement with a seat rib 78 surrounding a chamber in which is mounted a ball check valve 79, which engages a seat surrounding the end of a passage 80 which is connected to the passage 67, and thereby to the passage 66 leading from the operating chamber 32 at the face of the piston 30 of the application portion 8. The valve chamber 75 is constantly connected by way of a passage 82 with the passage 70 leading to the port in the seat of the slide valve 18 of the equalizing portion 7.

The delay valve device 9 shown in Fig. 1 of the drawing has associated therewith valve mechanism provided by this invention and indicated generally by the reference numeral 85 for effecting an increase in the rate of supply of fluid under pressure to the operating chamber 32 of the application portion 8 of the distributing valve 5.

As shown, the valve mechanism 85 comprises a movable abutment in the form of a diaphragm 86 which is subject on one side to the pressure of a spring 87, which is mounted in a chamber open to the atmosphere. A spring seat 88 is interposed between the spring 87 and the face of the diaphragm 86. The other face of the diaphragm 86 is adapted to engage an annular seat rib 90 surrounding a chamber 89 which is connected by way of a passage 91 with the passage 82, which is connected to the passage 70 leading from a port in the seat of the slide valve 18 of the equalizing portion 7 of the distributing valve 5. The passage 91 is controlled by means of a plug valve 92 which is turned by a handle 93. The plug valve 92 has a port therein which in one position of the plug valve establishes communication through the passage 91, while in another position of the plug valve communication is cut off through the passage 91.

The chamber 94 at the face of the diaphragm 86 outwardly of the seat rib 90 is connected by way of a passage 95 with the passage 80, and thereby with the passage 66 leading to the operating chamber 32 at the face of the piston 30 of application portion 8.

The delay valve device 9 has associated therewith a control valve 10 comprising a body 96 having mounted therein a plug valve 97 operated by a handle 98. The plug valve 97 has a port extending therethrough, which in one position of the plug valve establishes communication between a branch of the pipe 45, leading from the reservoir 3, and a pipe 100 which is constantly connected to the chamber 58 at the spring side of the piston 52 of the delay valve device 9.

When the handle 98 is turned to its other position, the plug valve 97 is turned to a position in which it cuts off communication between the pipe 45 and the pipe 100, and in which the port in the plug valve 97 establishes communication between the pipe 100 and an atmospheric port 102 so that the chamber 58 of the delay valve device 9 is vented to the atmosphere.

When the handle 98 of the control valve 10 is in the position in which it is shown in Fig. 1 of the drawing, which is its delay position, fluid under pressure is supplied from the reservoir 3 to the pipe 100, and thence to the chamber 58 at the face of the piston 52 of the delay valve device 9 and charges this chamber with fluid under pressure at the pressure maintained in the main reservoir 3. At this time, the valve chamber 54 at the other face of the piston 52 is also charged with fluid under pressure from the main reservoir 3, and the pressures at the opposite sides of the piston 52 being equal, the piston 52 is held by the spring 59 in engagement with the shoulder 60. This is delay position of the piston 52.

In initially charging the equipment, fluid under pressure is supplied from the reservoir 3 to the brake pipe 1 by operation of the engineer's brake valve, not shown. Fluid under pressure supplied to the brake pipe 1 flows therefrom by way of the branch pipe and passage 15 to the chamber 14 at the face of the piston 12 of the equalizing portion of the distributing valve, and on an increase in the pressure of the fluid in the chamber 14, the piston 12 is moved to its release position, if it is not already in this position, in which communication is opened through a feed groove 105 so that fluid under pressure may flow from the chamber 14 through the feed groove 105 to the valve chamber 17, from which fluid under pressure flows by way of the passage 20 to the chamber 21, and thence by way of the passage 23 to the pressure chamber 24 to charge the pressure chamber 24 and the valve chamber 17 to the pressure carried in the brake pipe 1.

In operation, assuming that the handle 98 of the control valve 10 is in the delay position, as shown in Fig. 1, and that the handle 93 associated with the plug valve 92 of the valve mechanism 85 is in the open position, as shown in Fig. 1, then upon a reduction in brake pipe pressure at an emergency rate, there is a corresponding reduction in the pressure of the fluid in the chamber 14 at the face of the piston 12, and the piston 12 moves to the right, as viewed in Fig. 1 of the drawing, into engagement with the gasket 106 clamped between two of the sections of the body of the equalizing portion of the distributing valve, while the projection 29 carried by the piston 12 engages the plunger 26 and moves it against the spring 28. This is the position in which the piston 12 is shown in Fig. 1 of the drawing, and is the emergency application position of the piston.

On this movement of the piston 12, the slide valve 18 is moved to a position in which a cavity 108 therein establishes communication between the passage 20 and the passage 70 which leads to the delay valve device 9.

Fluid under pressure supplied from the pressure chamber 24 and the valve chamber 17 to the passage 20, will thereupon flow through the cavity 108 to the passage 70, and thence to the delay valve device 9. At this time the end of the passage 70 is blanked by the slide valve 55 of the delay valve device 9. Fluid under pressure supplied to the passage 70 will flow by way of the passage 82 to the valve chamber 75, while fluid which is supplied to the passage 82 also flows through the passage 91 to the chamber 89 within the seat rib 90. The chamber 89 within the seat rib 90 is of such size, however, that the force exerted on the diaphragm 86 by fluid under pressure present therein is negligible, and is insufficient to move the diaphragm 86 against the spring 87.

Fluid under pressure supplied to the passage 70 will also flow therefrom at a restricted rate through choke 68 to the passage 67, and thence to the passage 66 leading to the operating chamber 32 at the face of the piston 30 of the application portion 8. Fluid under pressure supplied to the passage 66 will also flow through the cavity 62 in the slide valve 55 to the passage 64 leading to the application chamber 65. As a result of the supply of fluid under pressure to the operating chamber 32, and to the application chamber 65, there will be an increase in the pressure of the fluid in these chambers. However, because of the limited flow capacity of the choke 68, the rate of increase in the chambers 32 and 65 will be relatively slow.

On an increase in the pressure of the fluid in the operating chamber 32, the piston 30 of the application portion 8 is moved to the right, as viewed in Fig. 1 of the drawing, and moves the slide valve 35 to a position to cut off communication between the valve chamber 34 and the atmospheric passage 40, while the end of the stem 36 engages the supply valve 42 and moves it against the springs 47 and 48 away from the seat rib 49, to thereby open communication between the chamber 43 and the valve chamber 34 so that fluid under pressure supplied from the reservoir 3 to the chamber 43 may flow to the valve chamber 34, and thence by way of the passage and pipe 38 to the brake cylinder 2.

On an increase in the pressure of the fluid in the valve chamber 34 substantially to or slightly above the pressure present in the operating chamber 32 at the opposite face of the piston 30, the piston 30 is moved to the left, as viewed in Fig. 1 of the drawing, thereby permitting the supply valve 42 to be moved by the springs 47 and 48 towards the seat rib 49 to restrict the communication between the chamber 43 and the valve chamber 34, to thereby restrict the supply of fluid under pressure to the brake cylinder. On this movement of the piston 30, the stem 36 is moved relative to the slide valve 35, which remains in the position to cut off communication between the valve chamber 34 and the atmospheric port 40.

On the continued increase in the pressure of the fluid in the operating chamber 32, the piston 30 will again be moved to the right, as viewed in Fig. 1 of the drawing, so that the stem 36 moves the supply valve 42 farther away from the seat rib 49 to increase the rate of supply of fluid under pressure from the chamber 43 to the valve chamber 34, and thence by way of the passage 38 to the brake cylinder 2. It will be seen, therefore, that the application portion 8 operates to supply fluid under pressure to the brake cylinder 2 to increase the pressure of the fluid in the brake cylinder at substantially the same rate as the pressure of the fluid in the operating chamber 32 at the face of the piston 30 of the application portion 8 is increased by fluid under pressure supplied thereto by the equalizing portion 7 of the distributing valve 5.

At this time the rate of increase in the pressure of the fluid in the operating chamber 32 is relatively slow because, as pointed out above, the choke 68 through which fluid under pressure is supplied from the equalizing portion 7 to the operating chamber 32, and to the application chamber 65, is of relatively small flow capacity.

On the supply of fluid under pressure to the passage 66 leading to the operating chamber 32, fluid under pressure flows therefrom by way of the passage 80, and thence through the passage 95 to the chamber 94 at the face of the diaphragm 86 outwardly of the seat rib 90. The pressure of the fluid in the chamber 94 will, therefore, be increased at the same rate as the pressure of the fluid in the application chamber 65, and in the operating chamber 32 of the application portion 8 is increased.

When the pressure of the fluid in the chamber 94 has increased to a predetermined value, the force exerted thereby upon the diaphragm 86 is sufficient to overcome the opposing force of the spring 87, and the diaphragm 86 is thereupon moved against the spring 87 away from the seat rib 90, and on this movement of the diaphragm 86, fluid under pressure supplied from the passage 70 through the passages 82 and 91 to the chamber 89 within the seat rib 90 may flow past the seat rib 90 to the chamber 94, from which it flows at a rapid rate by way of the passage 95 and the passage 80 to the passage 66 leading to the operating chamber 32 of the application portion 8. The pressure of the fluid in the operating chamber 32 and in the application chamber 65 will thereafter increase at a rapid rate, while the application portion 8 will operate to supply fluid under pressure to the brake cylinder 2 to increase the pressure of the fluid therein at substantially the same rate as the pressure of the fluid in the chamber 32 is increased.

It will be seen, therefore, on an emergency application of the brakes that the delay valve device 9 operates to initially restrict the rate of supply of fluid under pressure to the application portion of the distributing valve to thereby retard the application of the brakes on the locomotive. This permits the slack in the train to gather and gives the brakes on the cars of the train an opportunity to apply.

After a brief time interval the valve mechanism 85 provided by this invention operates to increase the rate of supply of fluid under pressure to the operating chamber 32 of the application portion 8, to thereby effect operation of the application portion to supply fluid under pressure to the brake cylinder 2 at a more rapid rate, and thus increase the rate of application of the brakes on the locomotive, and accordingly reduce the time and distance required to stop the locomotive and the train hauled thereby. The valve mechanism 85 will not operate to increase the rate of supply of fluid under pressure to the application portion 8, however, until after a predetermined pressure has been established in the operating chamber 32 and in the brake cylinder, which is sufficient to cause the slack in the train to gather, and thus prevent a harsh run in of the slack in the train which would be occasioned if the brakes on the locomotive were initially applied at a rapid rate.

On a subsequent increase in brake pipe pressure to effect the release of the brakes, fluid under pressure flows from the brake pipe by way of the branch pipe 15 to the chamber 14 at the face of the piston 12 of the equalizing portion 7 of the distributing valve 5, and on an increase in the pressure of the fluid in the chamber 14, the piston 12 is moved from the emergency application position to its release position in which the feed groove 105 again establishes communication around the piston so that fluid under pressure may flow from the chamber 14 to the valve chamber 17, and thence by way of the passage 20 to the chamber 21, and therefrom through the passage 23 to the pressure chamber 24 to charge the valve chamber 17 and the pressure chamber 24 to the pressure carried in the brake pipe 1.

On movement of the piston 12 to the release position, the slide valve 18 is moved upon its seat to a position in which a cavity therein, not shown, establishes communication between the passage 70 and an atmospheric port. On the release of fluid under pressure from the passage 70, fluid flows thereto from the operating chamber 32 through the passage 66, the passage 80, past the ball check valve 79 and the check valve 76 to the valve chamber 75, and thence through the passage 82 which is connected to the passage 70.

Fluid under pressure may also flow from the passage 66 through the passage 67, and thence at a restricted rate through the choke 68 to the passage 70.

In addition, fluid under pressure flows from the application chamber 65 through the passage 64, and through the cavity 62 to the passage 66, and thence to the passage 70 as explained above.

On the reduction in the pressure of the fluid in the passage 70, fluid also flows thereto from the chamber 94 at the face of the diaphragm 86 through the passage 95 to the passage 80, and thence past the check valves 79 and 76 to the valve chamber 75, and therefrom to the passage 70, while fluid under pressure may flow from the chamber 89 within the seat rib 90 through the passage 91 to the passage 82, and thence to the passage 70 through which it is released to the atmosphere.

On the reduction in the pressure of the fluid in the chamber 94, and in the chamber 89 within the seat rib 90 at the face of the diaphragm 86 to a predetermined value, there is a corresponding reduction in the force exerted by this fluid under pressure upon the diaphragm 86, and this diaphragm is moved into engagement with the seat rib 90 by the spring 87.

On a reduction in the pressure of the fluid in the operating chamber 32, the higher pressure of the fluid in the valve chamber 34 at the opposite face of the piston 30 moves the piston 30 to the left, as viewed in Fig. 1 of the drawing, so that the stem 36 no longer engages the supply valve 42, which is held in engagement with the seat rib 49 by the springs 47 and 48. On this movement of the piston 30, the stem 36 is initially moved relative to the slide valve 35, but upon further movement on the piston 30, the supply valve 35 is moved upon its seat so as to open communication between the valve chamber 34 and the atmospheric passage 40 to thereby release fluid under pressure from the valve chamber 34 to the atmosphere, while fluid under pressure will flow from the brake cylinder 2 by way of the pipe and passage 38 to the valve chamber 34, and thence to the atmosphere, thus releasing the brakes on the locomotive.

The valve mechanism 85 provided by this invention may be rendered inoperative, if desired, so that there will be no increase in the rate of build up of brake cylinder pressure on the locomotive during an emergency application of the brakes. This feature is valuable in certain types of service, as where the locomotive is employed in slow freight train service in which the locomotive and the train hauled thereby can be stopped promptly enough, even when the application of the brakes on the locomotive is retarded, while the locomotive will keep the slack in the train stretched out and prevent objectionable slack action in the train.

In order to render the valve mechanism 85 inoperative, the handle 93 is turned from the open position in which it is shown in Fig. 1 of the drawing, to the closed position, which is the position indicated by a line 93a in this figure of the drawing. On this movement of the handle 93, the plug valve 92 is turned to a position in which the port therethrough no longer establishes communication through the passage 91, while the plug valve 92 cuts off communication through this passage.

With the plug valve 92 in the closed position, on the supply of fluid under pressure by the equalizing portion 7 to the passage 70, fluid will flow at a restricted rate through the choke 68 to the passage 66 leading to the operating chamber 32 of the application portion 8, while fluid supplied to the passage 66 will flow through the cavity 62 to the passage 64 leading to the application chamber 65 to increase the pressure of the fluid in these chambers. In addition, fluid under pressure supplied through the choke 68 will flow to the passage 80 and thence by way of the passage 95 to the chamber 94 at the face of the diaphragm 86, and on an increase in the pressure of the fluid in this chamber to a predetermined value, the diaphragm 86 will be moved against the spring 87 away from the seat rib 90.

At this time, however, as the valve 92 is in the closed position, movement of the diaphragm 86 away from the seat rib 90 is without consequence, and fluid under pressure cannot flow from the passage 70 through the passage 82 to the chamber 94. Hence there will be no increase in the rate of supply of fluid under pressure to the application portion 8 by operation of the valve mechanism 85, and fluid under pressure will continue to flow to the application portion 8, and the application chamber 65, at the rate determined by the choke 68 until the pressure of the fluid in the chambers 32 and 65 has equalized with the fluid present in the pressure chamber 24.

Likewise, the rate of increase in the brake cylinder pressure on the locomotive will be gradual because of the gradual increase in the pressure of the fluid in the chamber 32 of the application portion 8.

If desired, the delay valve device 9 may be conditioned to permit the supply of fluid under pressure to the application portion 8 at a rapid rate on an emergency application of the brakes. To so condition the delay valve device 9, the handle 98 of the control valve 10 is turned from the delay position, in which it is shown in Fig. 1 of the drawing, a quarter of a turn to the non-delay position, thereby moving the plug valve 97 to a position in which it cuts off communication between the pipe 45 and the pipe 100, and in which the port in the plug valve 97 establishes communication between the pipe 100 and the atmospheric passage 102, to thereby release fluid under pressure from the pipe 100, and from the chamber 58 at the spring side of the piston 52 of the delay valve device 9.

On this reduction in the pressure of the fluid in the chamber 58, the piston 52 is moved against the spring 59 by the higher pressure of the fluid present in the valve chamber 54, and on this movement of the piston 52, the slide valve 55 is moved to a position in which the cavity 62 therein no longer establishes communication between the passage 64, leading to the application chamber 65, and the passage 66 leading to the operating chamber 32 of the application portion 8.

In addition, upon this movement of the piston 52, the slide valve 55 is moved to a position in which the cavity 72 therein establishes a communication between the passage 70 and the passage 66 which by-passes the choke 68, with the result that on the subsequent supply of fluid under pressure to the passage 70 by operation of the equalizing portion 7, fluid under pressure flows from the passage 70 at a rapid rate through the cavity 72 to the passage 66, and thence to the operating chamber 32 at the face of the piston 30 of the application portion 8, to increase the pressure of the fluid in this chamber at a rapid rate, and thereby cause operation of the application portion 8 to supply fluid under pressure to the brake cylinder 2 at a rapid rate.

On the supply of fluid under pressure to the passage 66, fluid flows therefrom by way of the passage 80 and the passage 95 to the chamber 94 at the face of the diaphragm 86 of the valve mechanism 85, and on a predetermined increase in the pressure of the fluid in this chamber, the diaphragm 86 is moved against the spring 87 away from the seat rib 90. If at this time the valve 92 is in the open position, fluid under pressure may flow from the passage 70 through the passage 82 and through the passage 91 to the chamber 94, and thence by way of the passage 95 and the passage 80 to the passage 66 leading to the application portion 8.

The supply of fluid under pressure from the passage 70 to the passage 66 by operation of the valve mechanism 85 is without consequence, however, because when the piston 52 and the slide valve 55 of the delay valve device 9 are in their non-delay position, fluid under pressure may flow from the passage 70 through the cavity 72 to the passage 66 at substantially as rapid a rate as fluid under pressure is supplied to the passage 70 by operation of the equalizing portion 7 of the distributing valve 5. Accordingly, when the delay valve device 9 is in its non-delay position it is immaterial whether the valve 92 of the valve mechanism 85 is in its open or closed position. In either event the supply of fluid under pressure to the application portion 8 will take place at a rapid rate.

In Fig. 2 of the drawing there is shown a modified form of valve mechanism provided by this invention for increasing the rate of supply of fluid under pressure to the application portion of the distributing valve during an emergency application of the brakes when the delay valve is conditioned to restrict the rate of supply of fluid under pressure to the application portion.

The valve mechanism 85 shown in Fig. 1 of the drawing operates on a predetermined increase in the pressure of the fluid in the operating chamber of the application portion to open a by-pass passage extending around the choke in the delay valve device 9 through which fluid is supplied in the delay position of the delay valve device, and thereby increase the rate of supply of fluid to the operating chamber of the application portion.

The valve mechanism shown in Fig. 2 of the drawing operates on a predetermined increase in the pressure of the fluid in the operating chamber of the application portion to effect movement of the piston and slide valve of the delay valve device from the delay position to the non-delay position and thereby effect an increase in the rate of supply of fluid to the operating chamber of the application portion.

The delay valve device is indicated generally by the reference numeral 9a, and is generally similar to the delay valve device 9 shown in Fig. 1 of the drawing, except as will be hereinafter particularly pointed out.

The delay valve device 9a has associated therewith valve mechanism indicated generally by the reference numeral 85a, and comprising a movable abutment in the form of a diaphragm 110 which is clamped between a casing cover section 112 and the body of the delay valve 9a. The body 112 has formed therein a valve chamber 114 which is connected by way of a passage 115 with the passage 100a, leading from a control valve 10 to the chamber 58a at the face of the piston 52a of the delay valve device 9a. The passage 100a has interposed therein a choke 116 for restricting the rate of flow of fluid to the chamber 58a.

A valve 118 is mounted in the chamber 114 and is yieldingly pressed by a spring 119 into engagement with a seat rib on a member 120 surrounding a passage open to a chamber 122, which is constantly connected to the atmosphere by way of a passage 124.

The valve 118 is engaged by the end of a stem 125 having a head which engages one face of the diaphragm 110, while the lower face of the diaphragm 110 is adapted to engage projections 127 extending into the chamber 128 at the lower face of the diaphragm 110. A spring 129 is mounted in the chamber 122 and extends between the member 120 and the head of the stem 125 and yieldingly presses the diaphragm 110 against the projections 127.

The chamber 128 is connected by way of a passage 130 with the passage 80a in the delay valve device 9a, while communication through the passage 130 is controlled by means of a plug valve 132, which in one position cuts off communication through the passage 130, and which in another position has a port therein which establishes communication through the passage 130.

In operation, assuming that the handle 98 of the control valve 10 is in delay position, as shown in Fig. 1 of the drawing, fluid under pressure is supplied from the reservoir 3 to the passage 100a in the body of the distributing valve, and through the choke 116 to the chamber 58a at the face of the piston 52a. The pressure of the fluid in the chamber 58a, therefore, will be maintained at the pressure present in the reservoir 3, and the piston 52a will be held by the spring 59a in engagement with the shoulder 60a, while the slide valve 55a will be held in a position in which the cavity 72a therein does not establish communication between the passage 70a and the passage 66a, and in which the cavity 62a therein establishes communication between the passage 66a and the passage 64a. This is the delay position of the piston and slide valve of the delay valve device 9a.

If at this time there is a reduction in brake pipe pressure at an emergency rate, the equalizing portion of the distributing valve will operate, as described in detail above, to supply fluid under pressure from the pressure chamber to the passage 70a. Fluid under pressure supplied to the passage 70a will flow therefrom through the choke 68a at a restricted rate and to the passage 67a, which is connected to the passage 66a leading to the operating chamber at the face of the piston of the application portion of the distributing valve. Fluid under pressure supplied to the passage 66a will flow through the cavity 62a in the slide valve 55a to the passage 64a, leading to the application chamber 65 of the distributing valve.

In addition, fluid under pressure which flows through the choke 68a to the passage 67a will flow to the passage 130, and, assuming that the plug valve 132 is in the open position, as shown in Fig. 2 of the drawing, fluid under pressure supplied to the passage 130 will flow to the chamber 128 at the face of the diaphragm 110, and will increase the pressure of the fluid in this chamber at substantially the same rate as the pressure of the fluid in the operating chamber of the application portion and in the application chamber is increased.

On an increase in the pressure of the fluid in the operating chamber of the application portion, the application portion of the distributing valve operates, as described in detail above, to supply fluid under pressure to the brake cylinder to increase the pressure of the fluid present therein substantially as rapidly as the pressure of the fluid in the operating chamber is increased by the supply of fluid thereto by operation of the equalizing portion of the distributing valve. At this time, however, because of the restricted flow capacity of the choke 68a, and because of the volume of the operating chamber and of the application chamber, the increase in the pressure of the fluid in the operating chamber of the application portion will take place slowly, and the build-up of brake cylinder pressure will accordingly be at a slow rate.

When the pressure of the fluid in the operating chamber and in the application chamber is increased to a predetermined relatively low value, the fluid under pressure present in the chamber 128 at the face of the diaphragm 110 of the valve mechanism 85a will exert sufficient force upon the diaphragm 110 to move the diaphragm against the opposing force of the spring 129, thereby moving the valve 118 against the spring 119 away from the seat rib on the member 120.

On movement of the valve 118 away from the seat rib on the member 120, fluid under pressure is released from the chamber 114 at a rapid rate to the chamber 122, and thence to the atmosphere through the passage 124. On this release of fluid under pressure from the chamber 114, fluid flows thereto from the chamber 58a at the face of the piston 52a by way of the passage 100a and the passage 115 at a substantially more rapid rate than fluid under pressure may be supplied through the choke 116, with the result that there is a rapid reduction in the pressure of the fluid in the chamber 58a, and the piston 52a is thereupon moved against the spring 59a by the higher pressure of the fluid present in the valve chamber 54a at the opposite face of the piston 52a.

Accordingly the piston 52a and the slide valve 55a are moved upwardly from the delay position to the non-delay position, in which the cavity 62a no longer establishes communication between the passages 66a and 64a, and in which the cavity 72a establishes a communication between the passage 70a and the passage 66a which bypasses the choke 68a. On movement of the slide valve 55a to the non-delay position, fluid under pressure supplied to the passage 70a by operation of the equalizing portion of the distributing valve will flow at a rapid rate through the cavity 62a to the passage 66a, and thence to the operating chamber at the face of the piston of the application portion, and will increase pressure of the fluid in this chamber at the rapid rate, while the application portion will thereupon operate to supply fluid under pressure to the brake cylinder to increase the pressure therein at a rapid rate.

At this time, as the cavity 62a in the slide valve 55a of the delay valve device 9a does not establish communication between the passage 66a and the passage 64a leading to the application chamber, no fluid under pressure is supplied to the application chamber, and all of the fluid under pressure supplied to the passage 66a is available to increase the pressure of the fluid in the operating chamber of the application portion with the result that the pressure of the fluid in the operating chamber will be increased at a rapid rate, not only because of the rapid rate of flow of fluid through the cavity 72a in the slide valve 55a, but also because fluid under pressure supplied to the passage 66a is not diverted to the application chamber to increase the pressure therein.

During an application of the brakes after operation of the valve mechanism 85a to vent fluid from the chamber 58a at the face of the piston 52a of the delay valve device 9a, the valve 118 is held in the open position, with the result that fluid under pressure continues to be released from the passage 100a as long as the brakes remain applied. The valve mechanism 85a releases fluid under pressure from the passage 100a at a more rapid rate than fluid under pressure is supplied through the choke 116 with the result that the piston and slide valve of the delay valve device remain in their non-delay positions.

It will be seen that on an emergency application of the brakes at a time at which the delay valve device 9a is conditioned to restrict the rate of supply of fluid under pressure to the application portion of the distributing valve, the valve mechanism 85a provided by this invention operates automatically, after a predetermined pressure has been established in the application portion of the distributing valve, to increase the rate of supply of fluid under pressure to the application portion.

The valve mechanism 85a provided by this invention is arranged so that it will not operate to effect an increase in the rate of supply of fluid under pressure to the application portion until a predetermined pressure has been established therein which is sufficient to produce a mild application of the brakes on the locomotive, and thus produce a mild run in of the slack in the train hauled by the locomotive. In addition, the time required to develop this increase in the pressure in the application portion is such that before this pressure is reached, the brakes on the cars of the train hauled by the locomotive will have had an opportunity to apply.

Accordingly the valve mechanism 85a provided by this invention does not operate to increase the rate of supply of fluid under pressure to the application portion, and thus increase the rate of build-up of brake cylinder pressure on the locomotive, until after the slack in the train has gathered so that the rapid build-up of brake cylinder pressure which follows will not produce an objectionable run in of slack in the train. As the rate of build-up of brake cylinder pressure is increased after an initial supply at a restricted rate, the application of the brakes on the locomotive will take place at a rapid rate with the result that the train can be stopped more quickly than would be the case if this increase in the rate of brake cylinder build-up were not effected.

On a subsequent increase in brake pipe pressure to effect a release of the brakes, the equalizing portion of the distributing valve operates, as described in detail above, and in the above identified patents, to release fluid under pressure from the passage 70a, and on this reduction in the pressure of the fluid in this passage, fluid from the operating chamber of the application portion flows through the passage 66a to the passage 67a, and thence through the passage 80a, and past the ball check valve 79a and the check valve 76a, which is moved away from its seat against the spring 77a, to the chamber 75a, and thence by way of the passage 82a to the passage 70a, and therefrom to the equalizing portion from which the fluid is released to the atmosphere. Fluid under pressure may flow at a rapid rate past the check valves 79a and 76a to permit the brakes on the locomotive to be released quickly.

In addition, fluid under pressure may flow from the passage 66a through the cavity 72a to the passage 70a, since, as pointed out above, the piston and slide valve of the delay valve device are moved to their non-delay positions.

On the reduction in the pressure of the fluid in the operating chamber of the application portion, this portion operates, as described above, to release fluid under pressure from the brake cylinder, while on the release of fluid under pressure from the passage 66a, fluid flows thereto from the chamber 128 at the face of the diaphragm 110 of the valve mechanism 85a to reduce the pressure of the fluid therein substantially at the same rate as the fluid in the operating chamber of the application portion is reduced.

When the pressure of the fluid in the chamber 128 at the face of the diaphragm 110 has been reduced to a predetermined relatively low value, the force exerted thereby upon the diaphragm 110 is insufficient to maintain the diaphragm against the opposing force of the spring 129 assisted by spring 119, and these springs then move the diaphragm into engagement with the projections 127, while the valve 118 is moved into engagement with the seat rib on the member 120 to cut off the release of fluid under pressure from the chamber 114 to the atmosphere through the passage 124. On movement of the valve 118 to the seated position, fluid under pressure is no longer released from the chamber 58a at the face of the piston 52a of the delay valve device 9a, and as a result of the continued supply of fluid under pressure through the passage 100a and the choke 116, the pressure of the fluid in the chamber 58a is quickly increased to the pressure present in the reservoir 3, and the pressure at the opposite faces of the piston 52a being substantially equal, the piston 52a is moved by the spring 59a into engagement with the shoulder 60a.

As a result of this movement of the piston 60a, the slide valve 55a is moved to the position in which the cavity 72a therein no longer establishes communication between the passage 66a and the passage 70a, while the cavity 62a establishes communication between the passage 64a, leading from the application chamber, and the passage 66a, with the result that any fluid under pressure present in the application chamber may flow to the passage 66a, and thence past the check valves 79a and 76a to the passage 70a, from which it is released to the atmosphere by operation of the equalizing portion of the distributing valve.

The delay valve device 9a and the valve mechanism 85a are now in the position in which they are shown in Fig. 2 of the drawing, and the equipment is ready for operation on a subsequent emergency application of the brakes.

If the increase in the rate of brake cylinder build-up during an emergency application of the brakes is not desired, the valve mechanism 85a may be rendered inoperative to thereby prevent movement of the piston and slide valve of the delay valve device 9a to their non-delay positions. In order to render the valve mechanism 85a inoperative, the plug valve 132 is turned to the closed position by means of a suitable handle, not shown, thereby cutting off communication through the passage 130.

On a subsequent emergency application of the brakes, and operation of the equalizing portion of the distributing valve to supply fluid under pressure to the passage 70a, fluid under pressure will flow through the choke 68a to the passage 66a, leading to the operating chamber of the application portion, while fluid under pressure supplied through the choke 68a will also flow to the passage 130, but cannot flow therethrough to the chamber 128 at the face of the diaphragm 110 of the valve mechanism 85a. Accordingly there will be no increase in the pressure of the fluid in the chamber 128, and the diaphragm 110 will not be operated to move the valve 118 away from its seat. There will, therefore, be no reduction in the pressure of the fluid in the chamber 58a at the face of the piston 52a of the delay valve device 9a, and this piston will remain in engagement with the shoulder 60a to maintain the slide valve 55a in its delay position, as shown in Fig. 2 of the drawing.

The valve mechanism 85a provided by this invention is arranged so that it will not affect the delay valve device 9a when the piston and slide valve of the delay valve device are in the non-delay position. In order to cause the piston and slide valve of the delay valve device 9a to occupy the non-delay position, the handle of the control valve, not shown, associated with the delay valve device 9a is turned to the non-delay position in which the supply of fluid under pressure from the reservoir 3 to the pipe 100a is cut off, and in which fluid under pressure is released from the pipe 100a with the result that the chamber 58a at the face of the piston 52a of the delay valve device 9a is maintained at atmospheric pressure, while the higher pressure of the fluid in the valve chamber 54a maintains the piston in its upper position against the spring 59a. This is the non-delay position of the piston and slide valve.

If at this time, an emergency application of the brakes is effected, and the plug valve 132 of the valve mechanism 85a is in the open position, as shown in Fig. 2 of the drawing, then on the supply of fluid under pressure to the chamber 128, and on movement of the diaphragm 110 against the springs 129 and 119, the valve 118 will be moved away from its seat, but as no fluid under pressure is present in the chamber 114, or in the chamber 58a of the delay valve device 9a, movement of the valve 118 away from its seat is without consequence, and the piston 52a of the delay valve device remains in the position which it already occupies.

In Fig. 3 of the drawing there is shown still another form of valve mechanism provided by this invention. This valve mechanism is indicated generally by the reference numeral 85b, and is associated with a delay valve 9b, which is the same, except as particularly pointed out hereafter, as the corresponding delay valve shown in Fig. 1 of the drawing.

The valve mechanism 85 shown in Fig. 1 of the drawing operates on a predetermined increase in the pressure of the fluid in the operating chamber of the application portion to open a by-pass passage through which fluid under pressure may be supplied to the operating chamber, while the mechanism 85a shown in Fig. 2 of the drawing operates on a predetermined increase in the pressure of the fluid in the operating chamber of the application portion to cause the piston and slide valve of the delay valve device to move from the delay position to the non-delay position, and thereby effect an increase in the rate of supply of fluid to the application portion.

The valve mechanism 85b shown in Fig. 3 of the drawing operates on a predetermined increase in the pressure of the fluid in the operating chamber of the application portion to cut off the supply of fluid from the operating chamber to the application chamber of the distributing valve, and thereby effect an increase in the rate of increase in the pressure in the operating chamber of the application portion.

The valve mechanism 85b comprises a diaphragm 140 which is clamped between confronting flanges on a cover 141 and a portion of the body of the delay valve device 9b. The diaphragm 140 has at one face thereof a chamber 143, and has at the other face thereof a chamber 144, which is constantly connected by way of a passage 64b with the application chamber 10 of the distributing valve.

The valve mechanism 85b has associated therewith a plug valve 146 which is operated by a handle 147 and controls a passage 148 open to the chamber 143. In one position of the plug valve 146 communication between the passage 64b and the passage 148 is cut off, while a port in the plug valve 146 connects the passage 148 to an atmospheric passage 149. In another position of the plug valve 146, communication between the passage 148 and the atmospheric passage 149 is cut off, while the port in the plug valve 146 establishes communication between the passage 64b and the passage 148.

The body of the delay valve device 9b has associated therewith a member 150 having projections indicated at 152 formed thereon, and adapted to be engaged by a face of the diaphragm 140, while a coil spring 153 is mounted in the chamber 143 and yieldingly presses the diaphragm 140 into engagement with the projections 152.

The diaphragm 140 has secured thereto a fluted stem 154 which extends through a central opening in the member 150 and engages a valve 155 mounted in a chamber 156 at the lower side of the member 150. The valve 155 is adapted to engage, at certain times, a seat rib 158 formed on the member 150 surrounding the opening through which the stem 154 extends, while a coil spring 159 is mounted in the chamber 156 and yieldingly presses the valve 155 to the seated position. The stem 154 is of such length that when the diaphragm 140 is in engagement with the projections 152, the stem will engage the valve 155 and hold it away from the seat rib 158.

The springs 153 and 159 are proportioned so that the spring 153 is substantially stronger than the spring 159 with the result that the spring 153 operating through the diaphragm 140 and the stem 154 is able to hold the valve 155 in the open position against the spring 159.

In operation, assuming that the plug valve 146 of the valve mechanism 85b, and that the piston 52b and slide valve 55b of the delay valve device 9b are in the positions in which they are shown in Fig. 3 of the drawing, then on an emergency reduction in brake pipe pressure and on operation of the equalizing portion of the distributing valve to supply fluid under pressure to the passage 78b, fluid under pressure will flow therefrom through the choke 68b to the passage 67b, and thence to the passage 66b leading to the operating chamber of the application portion of the distributing valve.

Fluid under pressure supplied to the passage 66b will flow therefrom through the cavity 62b in the slide valve 55b of the delay valve device 9b to the passage 64c leading to the chamber 156 of the valve mechanism 85b. Fluid under pressure supplied to the chamber 156 will flow therefrom past the seat rib 158 and through the opening in the member 150 in which the fluted stem 154 is mounted to the chamber 144 at the face of the diaphragm 140. Fluid under pressure which flows to the chamber 144 may flow freely through the spaces between the projections 152 so that the entire face of the diaphragm 140 subject to fluid under pressure.

Fluid under pressure which flows to the chamber 144 flows therefrom by way of the passage 64b to the application chamber so that the pressure of the fluid in the application chamber is increased at the same rate as the pressure of the fluid in the operating chamber of the application portion of the distributing valve is increased. The rate of increase in the pressure of the fluid in the operating chamber of the application portion, and in the application chamber, will be relatively slow because of the volume of these chambers, and because of the restricted flow capacity of the choke 68b.

It will be seen that at this time as the plug valve 146 of the valve mechanism 85b is in the closed position, fluid under pressure which is supplied to the passage 64b cannot flow to the chamber 143 at the spring side of the diaphragm 140, while this chamber is maintained at atmopsheric pressure.

As the pressure of the fluid in the operating chamber and in the application chamber increases, there is a corresponding increase in the pressure of the fluid in the chamber 144 at the face of the diaphragm 140, and a similar increase in the force exerted on this diaphragm against the spring 153. The various parts of the valve mechanism 85b are arranged and proportioned so that when the pressure of the fluid in the chamber 144 has increased to the predetermined relatively low value, the force exerted thereby on the diaphragm 140 is sufficient to move the diaphragm against the opposing force of the spring 153, and the diaphragm is moved until the end of the stem 154 engages a stop 161 formed integral with the cover 140.

On this movement of the diaphragm 140, the stem 154 is moved away from the valve 155, and this valve is moved by the spring 159 into engagement with the seat rib 158 to thereby cut off flow of fluid from the chamber 156 to the chamber 144, and thence by way of the passage 64b to the application chamber 65. Accordingly, fluid under pressure supplied from the passage 70b through the choke 68b to the passage 66b can no longer flow to the application chamber, and all of the fluid which flows through the choke 68b flows through the passage 66b to the operating chamber at the face of the piston of the application portion 8. The volume of the operating chamber at the face of the piston of the application portion is so small that even though fluid under pressure flows through the choke 68b at a restricted rate, there will be a rapid increase in the pressure of the fluid in the operating chamber, and the application portion 8 of the distributing valve will operate to supply fluid under pressure to the brake cylinder to increase the pressure therein in a rapid rate.

It will be seen that the valve mechanism 85b provided by this invention operates to permit the supply of fluid under pressure to the application chamber of the distributing valve until the pressure of the fluid therein has increased to a predetermined value. As fluid under pressure is initially supplied to the application chamber during an emergency application of the brakes, the rate of increase in the pressure of the fluid in the operating chamber of the application portion of the distributing valve will be relatively slow, and the application portion will operate to produce a slow build-up of brake cylinder pressure on the locomotive to thereby produce a mild run in of the slack in the train, and to give the brakes on the cars of the train hauled by the locomotive an opportunity to apply.

When the pressure of the fluid in the application chamber has increased to a predetermined value, the valve mechanism 85b operates to cut off the further supply of fluid under pressure to this chamber, thus effecting an increase in the rate of supply of fluid under pressure to the application portion of the distributing valve, and causing this portion to operate to supply fluid under pressure to the brake cylinder at a more rapid rate.

On an increase in brake pipe pressure to effect the release of the brakes, the equalizing portion of the distributing valve operates in the usual manner to release fluid under pressure from the passage 70b, and on the release of fluid under pressure from this passage, fluid flows thereto from the application portion of the distributing valve through the passage 66b, the passage 80b, past the check valves 79b and 76b to the valve chamber 75b, and thence by way of the passage 82b to the passage 70b, from which fluid is released to the atmosphere.

On this reduction in the pressure of the fluid in the passage 66b, fluid under pressure flows thereto from the chamber 156 of the valve mechanism 85b by way of the passage 64c and the cavity 62b in the slide valve 55b, and when the pressure of the fluid in the chamber 156 has been reduced to a predetermined relatively low value, the fluid under pressure present in the chamber 144 operating on the face of the valve 155 within the seat rib 158, assisted by the spring 153, moves the valve 155 away from the seat rib 158 against the spring 159 to thereby release fluid under pressure from the chamber 144 to the chamber 156. On this reduction in the pressure of the fluid in the chamber 144, there is a reduction in the force exerted by the fluid under pressure present therein on the diaphragm 140, and the spring 153 moves the diaphragm downwardly into engagement with the projections 152, while the valve 155 is moved farther away from the seat rib 158 against the spring 159 so that fluid under pressure may flow at a rapid rate from the chamber 144 to the chamber 156 from which it is released to the atmosphere, as explained above, while fluid will flow to the chamber 144 from the application chamber.

The valve mechanism 85b is now restored to the position in which it is shown in Fig. 3 of the drawing, and is conditioned for operation on a subsequent emergency application of the brakes.

If the increase in the rate of brake cylinder build-up on the locomotive during the emergency application of the brakes is not desired, the valve mechanism 85b may be rendered inoperative to thereby prevent the cutting off of the supply of fluid under pressure to the application chamber of the distributing valve.

If this method of operation is desired, the plug valve 146 is turned by the handle 147 to the position in which the port in the plug valve no longer connects the chamber 143 to the atmospheric port 149, and in which the port in the plug valve 146 establishes communication between the passage 64b and the passage 148 leading to the chamber 143.

With the plug valve 146 in this position, on operation of the equalizing portion of the distributing valve to supply fluid under pressure to the passage 70b, fluid under pressure flows therefrom at a restricted rate through the choke 68b to the passage 67b, and thence to the passage 66b leading to the operating chamber of the application portion. Fluid under pressure supplied to the passage 66b flows therefrom through the cavity 62b in the slide valve 55b of the delay valve device 9b to the passage 64c leading to the chamber 156 of the valve mechanism 85b.

Fluid under pressure supplied to the chamber 156 flows therefrom past the seat rib 158, through the passage in which the stem 154 is mounted to the chamber 144, and therefrom by way of the passage 64b to the application chamber 65 of the distributing valve, while fluid under pressure supplied to the passage 64b flows therefrom through the port in the plug valve 146 to the passage 148, and to the chamber 143 at the spring side of the diaphragm 140 to increase the pressure of the fluid in the chamber 143 substantially as rapidly as the pressure of the fluid in the chamber 144 is increased.

As the pressure of the fluid in the chambers 143 and 144 at the opposite sides of the diaphragm 140 are increased at substantially the same rate, no pressure differential is developed on this diaphragm to move it against the spring 153, and the diaphragm 140 will remain in engagement with the projections 152, while the valve 155 will be held away from the seat rib 158 against the spring 159. Accordingly, there will be no operation of the valve mechanism 85b to cut off the supply of fluid under pressure to the application chamber on an increase in the pressure of the fluid in this chamber, and fluid under pressure will continue to be supplied to this chamber until the pressure of the fluid therein, and in the operating chamber of the application portion, has equalized with the fluid in the pressure chamber of the distributing valve.

As the supply of fluid under pressure to the application chamber is not cut off, the rate of supply of fluid under pressure to the operating chamber of the application portion of the distributing valve remains the same, and the rate of increase in the operating chamber of the application portion will be relatively slow because of the restricted flow capacity of the choke 68b, and because of the relatively large volume of the application chamber which is charged with fluid under pressure supplied through the choke 68b.

On subsequent operation of the equalizing portion of the distributing valve to release fluid under pressure from the passage 70b, fluid under pressure is released from the application chamber, and from the operating chamber of the application portion in the manner described in detail above.

The valve mechanism 85b is also arranged so that when the piston and slide valve of the delay valve device 9b are in the non-delay position, the rate of supply of fluid under pressure to the application portion during an emergency application of the brakes is not affected by operation of the valve mechanism 85b.

When the piston and slide valve of the delay valve device 9b are in the non-delay position, the cavity 62b in the slide valve 55b does not establish communication between the passage 66b and the passage 64c, while the cavity 72b in the slide valve 55b establishes communication between the passage 70b and the passage 66b. On the supply of fluid under pressure to the passage 70b, fluid flows through the cavity 72b to the passage 66b, but no fluid under pressure is supplied to the passage 64c so that the various parts of the valve mechanism 85b remain in the position in which they are shown in Fig. 3 of the drawing, and the valve mechanism 85b does not alter or modify the supply of fluid under pressure to the application portion in any way.

It will be seen that the locomotive brake equipment provided by this invention incorporates a delay valve which may be conditioned to operate during an emergency application of the brakes to restrict the rate of supply of fluid under pressure to the application portion of the distributing valve, and thereby restrict the rate of build-up of brake cylinder pressure on the locomotive. It will be seen also that the locomotive brake equipment provided by this invention incorporates, in addition, valve mechanism responsive to the pressure of the fluid supplied to the application portion and which may be employed to increase the rate of supply of fluid under pressure to the application portion of the distributing valve after an initial supply of fluid under pressure thereto at a restricted rate to thereby speed up the application of the brakes on the locomotive, and correspondingly reduce the time and distance required to stop the locomotive and a train hauled thereby.

The form of valve mechanism shown in Fig. 1 of the drawing operates in response to an increase in the pressure of the fluid supplied to the application portion of the distributing valve to open a by-pass passage through which fluid under pressure may flow to the application portion. The valve mechanism shown in Fig. 2 of the drawing operates to cause the piston and slide valve of the delay valve to move to the non-delay position to thereby increase the rate of supply of fluid to the application portion, while the valve mechanism shown in Fig. 3 effects an increase in the rate of supply of fluid under pressure to the application portion by cutting off the diversion of fluid to the application chamber.

While several embodiments of the improved locomotive brake equipment provided by this invention have been illustrated and described in detail, it should be understood that the invention is not limited to these details of construction, and that numerous changes and modifications may be made without departing from the scope of the following claims.

Having now described my invention, what I claim as new and desire to secure by Letters Patent is:

1. In a locomotive fluid pressure brake equipment, in combination, a brake pipe, an application valve device operative upon an increase in fluid pressure in an operating chamber for effecting an application of the brakes, a valve device operative upon a reduction in brake pipe pressure at an emergency rate for supplying fluid under pressure to said chamber, a delay valve device operative to restrict the rate at which fluid under pressure is supplied to said chamber, and valve means operative upon a predetermined increase in the pressure of fluid supplied to said chamber for increasing the rate at which fluid under pressure is supplied to said chamber.

2. In a vehicle fluid pressure brake equipment, in combination, a brake pipe, application means operative upon an increase in the pressure of the fluid in an operating chamber to effect an application of the brakes, valve means subject to and operated on a reduction in brake pipe pressure to supply fluid under pressure to said operating chamber, a delay valve for controlling the rate of increase in the pressure of the fluid in said operating chamber by fluid supplied by said valve means, said delay valve having a fast application position in which it permits the pressure in the operating chamber to increase at one rate and having a slow application position in which it reduces the rate of increase in the pressure of the fluid in said operating chamber to a less rapid rate, said delay valve having associated therewith means subject to and operated on a predetermined increase in the pressure of the fluid in said operating chamber when the delay valve is in its slow application position to increase the rate of increase in the pressure of the fluid in said operating chamber.

3. In a locomotive fluid pressure brake equipment, in combination, a brake pipe, a reservoir, a brake cylinder, application means operated on an increase in the pressure of the fluid in an operating chamber to supply fluid under pressure from the reservoir to the brake cylinder, valve means subject to the opposing pressures of the fluid in the brake pipe and of the fluid in a pressure chamber and operated on a reduction in brake pipe pressure to supply fluid under pressure from the pressure chamber to said operating chamber, a delay valve for controlling the rate of increase in the pressure of the fluid in said operating chamber by fluid supplied by said valve means, said delay valve having a fast application position in which it permits the pressure of the fluid in the operating chamber to increase at one rate and having a slow application position in which it reduces the rate of increase in the pressure of the fluid in said operating chamber to a less rapid rate, said delay valve having associated therewith means subject to and operated on a predetermined increase in the pressure of the fluid in said operating chamber when the delay valve is in the slow application position to increase the rate of increase in the pressure of the fluid in said operating chamber.

4. In a locomotive fluid pressure brake equipment, in combination, a brake pipe, a reservoir, a brake cylinder, application means operated on an increase in the pressure of the fluid in an operating chamber to supply fluid under pressure from the reservoir to the brake cylinder, valve means subject to the opposing pressures of the fluid in the brake pipe and of the fluid in a pressure chamber and operated on a reduction in brake pipe pressure to supply fluid under pressure from the pressure chamber to said operating chamber through a communication having a restriction therein, a delay valve controlling a by-pass passage extending around said restriction, and valve mechanism responsive to the pressure of the fluid in said operating chamber and controlling a by-pass passage extending around said restriction.

5. In a locomotive fluid pressure brake equipment, in combination, a brake pipe, a reservoir, a brake cylinder, application means operated on an increase in the pressure of the fluid in an operating chamber to supply fluid under pressure from the reservoir to the brake cylinder, valve means subject to the opposing pressures of the fluid in the brake pipe and of the fluid in a pressure chamber and operated on a reduction in brake pipe pressure to supply fluid under pressure from the pressure chamber to said operating chamber through a communication having a restriction therein, a delay valve controlling a by-pass passage extending around said restriction, and valve mechanism subject to and operated on a predetermined increase in the pressure of the fluid in said operating chamber to open communication through a by-pass passage extending around said restriction.

6. In a locomotive fluid pressure brake equipment, in combination, a brake pipe, a reservoir, a brake cylinder, application means operated on an increase in the pressure of the fluid in an operating chamber to supply fluid under pressure from the reservoir to the brake cylinder, valve means subject to the opposing pressures of the fluid in the brake pipe and of the fluid in a pressure chamber and operated on a reduction in brake pipe pressure to supply fluid under pressure from the pressure chamber to said operating chamber through a communication having a restriction therein, a delay valve controlling a by-pass passage extending around said restriction, valve mechanism responsive to the pressure of the fluid in said operating chamber and controlling a by-pass passage extending around said restriction, and manual means for also controlling the by-pass passage controlled by said valve mechanism.

7. In a locomotive fluid pressure brake equipment, in combination, a brake pipe, a reservoir, a brake cylinder, application means operated on an increase in the pressure of the fluid in an operating chamber to supply fluid under pressure from the reservoir to the brake cylinder, a valve means subject to the opposing pressures of the fluid in the brake pipe and of the fluid in a pressure chamber and operated on a reduction in brake pipe pressure to supply fluid under pressure from the pressure chamber to said operating chamber through a communication having a restriction therein, a delay valve controlling a by-pass passage extending around said restriction, valve mechanism subject to and operated on a predetermined increase in the pressure of the fluid in said operating chamber to open communication through a by-pass passage extending around said restriction, and manual means for also controlling the by-pass passage controlled by said valve mechanism.

8. In a vehicle fluid pressure brake equipment, in combination, application means operated on an increase in the pressure of the fluid in an operating chamber to effect an application of the brakes, valve means for supplying fluid under pressure to said operating chamber, a delay valve subject to the pressure of the fluid in a control chamber and controlling the rate of increase in the pressure of the fluid in said operating chamber by fluid supplied thereto by said valve means, and valve mechanism responsive to the pressure of the fluid in said operating chamber and controlling the pressure of the fluid in said control chamber.

9. In a vehicle fluid pressure brake equipment, in combination, application means operated on an increase in the pressure of the fluid in an operating chamber to effect an application of the brakes, valve means for supplying fluid under pressure to said operating chamber, a delay valve subject to the pressure of the fluid in a control chamber and controlling the rate of increase in the pressure of the fluid in said operating chamber by fluid supplied thereto by said valve means, said delay valve having a fast application position and a slow application position and being moved to the fast application position on a reduction in the pressure of the fluid in said control chamber, and valve mechanism subject to and operated on a predetermined increase in the pressure of the fluid in said operating chamber to release fluid from said control chamber.

10. In a vehicle fluid pressure brake equipment, in combination, application means operated on an increase in the pressure of the fluid in an operating chamber to effect an application of the brakes, valve means for supplying fluid under pressure to said operating chamber, a delay valve subject to the pressure of the fluid in a control chamber and controlling the rate of increase in the pressure of the fluid in said operating chamber by fluid supplied thereto by said valve means, valve mechanism controlling the pressure of the fluid in said control chamber, said valve mechanism comprising a movable abutment subject to the pressure of the fluid in a chamber at the face thereof, and manually controlled means for supplying fluid to said chamber from said operating chamber.

11. In a vehicle fluid pressure brake equipment, in combination, application means operated on an increase in the pressure of the fluid in an operating chamber to effect an application of the brakes, valve means for supplying fluid under pressure to said operating chamber, a delay valve subject to the pressure of the fluid in a control chamber and controlling the rate of increase in the pressure of the fluid in said operating chamber by fluid supplied thereto by said valve means, said delay valve having a fast application position and a slow application position and being moved to the fast application position on a reduction in the pressure of the fluid in said control chamber, manually controlled means for supplying fluid under pressure to said control chamber at a restricted rate, and valve mechanism subject to and operated on a predetermined increase in the pressure of the fluid in said operating chamber for releasing fluid from said control chamber at a rapid rate.

12. In a locomotive fluid pressure brake equipment, in combination, a brake pipe, an application valve device operative upon an increase in fluid pressure in an operating chamber for effecting an application of the brakes, a valve device operative upon a reduction in brake pipe pressure at an emergency rate for supplying fluid under pressure to said chamber, a delay valve device having one position in which the supply of fluid under pressure to said chamber is restricted and another position in which the rate of flow of fluid to said chamber is at a more rapid rate, and valve means operative upon a predetermined increase in the pressure of the fluid supplied to said chamber for effecting the operation of said delay valve device to provide the more rapid rate of flow.

13. In a vehicle fluid pressure brake equipment, in combination, application means operative on an increase in fluid pressure in an operating chamber to effect an application of the brakes, valve means for supplying fluid under pressure to said operating chamber, an application chamber, a delay valve controlling a communication through which fluid may flow from said operating chamber to said application chamber, and valve mechanism subject to and operated on a predetermined increase in the pressure of the fluid in said operating chamber to cut off said communication.

14. In a vehicle fluid pressure brake equipment, in combination, application means operative on an increase in fluid pressure in an operating chamber to effect an application of the brakes, valve means for supplying fluid under pressure to said operating chamber, an application chamber, a delay valve controlling a communication through which fluid may flow from said operating chamber to said application chamber, and valve mechanism responsive to the pressure of the fluid in said operating chamber for also controlling said communication.

15. In a vehicle fluid pressure brake equipment, in combination, application means operative on an increase in fluid pressure in an operating chamber to effect an application of the brakes, valve means for supplying fluid under pressure to said operating chamber, an application chamber, a delay valve controlling a communication through which fluid may flow from said operating chamber to said application chamber, valve mechanism for also controlling said communication, said valve mechanism comprising a movable abutment subject on one face to the pressure of the fluid in said application chamber and subject on the other face to the pressure of the fluid in a control chamber, a valve operative by said abutment on an increase in the pressure of the fluid in said application chamber to a predetermined value above the pressure in the control chamber to close said communication, and manually controlled means for supplying fluid under pressure from the application chamber to said control chamber.

16. In a vehicle fluid pressure brake equipment, in combination, application means operative on an increase in fluid pressure in an operating chamber to effect an application of the brakes, valve means for supplying fluid under pressure to said operating chamber, an application chamber, a delay valve controlling a communication through which fluid may flow from said operating chamber to said application chamber, valve mechanism for also controlling said communication, said valve mechanism being subject to the opposing pressures of the fluid in the application chamber and of the fluid in a control chamber, a valve operative by said abutment on an increase in the pressure of the fluid in said application chamber to a predetermined value above the pressure in the control chamber to close said communication, and manually controlled means for supplying fluid under pressure from the application chamber to said control chamber.

17. In a locomotive fluid pressure brake equipment, in combination, a brake pipe, an application valve device operative upon an increase in fluid pressure in an operating chamber for effecting an application of the brakes, a valve device operative upon a reduction in brake pipe pressure at an emergency rate for supplying fluid under pressure to said operating chamber and to an application chamber, and valve means operative upon a predetermined increase in the pressure of the fluid supplied to said chambers for cutting off the communication through which fluid under pressure is supplied to said application chamber.

18. In a vehicle fluid pressure brake equipment, in combination, application means operated on an increase in the pressure of the fluid in an operating chamber to effect an application of the brakes, a valve device for supplying fluid under pressure to said operating chamber, a manually controlled delay valve controlling the communication through which fluid is supplied to said operating chamber by said valve device, said delay valve having a delay position in which it restricts the rate at which fluid is supplied to said operating chamber by said valve device through said communication and having a fast application position in which it permits fluid to be supplied by said valve device to said operating chamber at a rapid rate, and valve means operative on a predetermined increase in the pressure of the fluid in said operating chamber when the delay valve is in the delay position for increasing the rate at which fluid under pressure is supplied to said operating chamber by said valve device.

19. In a vehicle fluid pressure brake equipment, in combination, application means operated on an increase in the pressure of the fluid in an operating chamber to effect an application of the brakes, a valve device for supplying fluid under pressure to said operating chamber, a delay valve responsive to the pressure of the fluid in a control chamber for restricting the rate of supply of fluid to said operating chamber by said valve device, a manually operated control valve for supplying and releasing fluid under pressure to and from said control chamber, and valve means operative upon a predetermined increase in the pressure of the fluid in said operating chamber for increasing the rate at which fluid under pressure is supplied to said operating chamber by said valve device.

CHARLES H. McKINSTRY.